United States Patent
Yang et al.

(10) Patent No.: US 11,125,968 B2
(45) Date of Patent: Sep. 21, 2021

(54) OPTICAL MODULE

(71) Applicant: DELTA ELECTRONICS, INC., Taoyuan (TW)

(72) Inventors: Chi-Ming Yang, Taoyuan (TW); Hui-Hsiung Wang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 93 days.

(21) Appl. No.: 16/292,888

(22) Filed: Mar. 5, 2019

(65) Prior Publication Data
US 2020/0150382 A1    May 14, 2020

(30) Foreign Application Priority Data

Nov. 13, 2018 (CN) .......................... 201811347421.6

(51) Int. Cl.
G02B 7/18 (2021.01)
G02B 26/08 (2006.01)
G03B 21/16 (2006.01)

(52) U.S. Cl.
CPC .......... *G02B 7/181* (2013.01); *G02B 26/0833* (2013.01); *G03B 21/16* (2013.01)

(58) Field of Classification Search
CPC ...... G02B 7/181; G02B 26/0833–0866; G02B 7/0035–0041; G02B 7/0083–0096; G02B 7/008; G02B 7/028; G03B 21/16
See application file for complete search history.

(56) References Cited

U.S. PATENT DOCUMENTS

| | | | |
|---|---|---|---|
| 6,967,839 B2 | 11/2005 | Chung et al. | |
| 2003/0020882 A1 | 1/2003 | Kalyandurg et al. | |
| 2003/0210452 A1* | 11/2003 | Haskett | G02B 26/0841 359/290 |
| 2009/0128935 A1* | 5/2009 | Nishino | G02B 26/0841 359/845 |
| 2010/0242605 A1* | 9/2010 | Offterdinger | G01P 1/023 73/514.38 |
| 2010/0271783 A1* | 10/2010 | Miyashita | G06F 1/20 361/707 |
| 2017/0102516 A1* | 4/2017 | Kondo | B81C 1/00317 |
| 2019/0179217 A1* | 6/2019 | Tang | G03B 21/16 |

FOREIGN PATENT DOCUMENTS

| | | |
|---|---|---|
| CN | 106019578 A | 10/2016 |
| CN | 104075294 B | 4/2017 |
| TW | 585278 | 4/2004 |
| WO | WO2011046741 A1 | 4/2011 |

OTHER PUBLICATIONS

Office Action in corresponding TW application No. 107140126 dated May 10, 2019.
Office Action dated Jun. 8, 2021 in CN Application No. 201811347421.6, w/English-language translation, 7 pages.

* cited by examiner

*Primary Examiner* — Kimberly N. Kakalec
(74) *Attorney, Agent, or Firm* — Muncy, Geissler, Olds & Lowe, P.C.

(57) ABSTRACT

An optical module is provided. The optical module includes a substrate, an optical element, a cover plate, and a heat-dissipating device. The optical element is disposed on the substrate, wherein the optical element has a first side and a second side opposite the first side. The cover plate is disposed on the second side of the optical element, and extends over the substrate. In addition, the substrate is disposed between the heat-dissipating device and the optical element.

11 Claims, 5 Drawing Sheets

OPTICAL MODULE

CROSS REFERENCE TO RELATED APPLICATIONS

This application claims priority of China Patent Application No. 201811347421.6, filed Nov. 13, 2018, the entirety of which is incorporated by reference herein.

BACKGROUND

Technical Field

The disclosure relates to an optical module, and in particular to an optical module that includes a cover plate configured to transmit heat energy.

Description of the Related Art

As technology continuously develops, the usage of electronic products is becoming more and more popular in our daily lives, and a projector is one of those electronic products. Currently, digital light processing (DLP) projectors employ a digital micromirror device (DMD) to reflect light in order to generate an image, and the projection of the image is performed. However, problems may arise due to the temperature difference between the light-emitting side and the rear side (namely, the surface that does not emit light) of the digital micromirror device when the digital light processing projector is in use.

BRIEF SUMMARY

For solving the aforementioned problems, some embodiments of the present disclosure provide an optical module. The optical module includes a substrate, an optical element, a cover plate and a heat-dissipating device. The optical element is disposed on the substrate, wherein the optical element has a first side and a second side, the first side faces the substrate, and the second side is opposite the first side. The cover plate is disposed on the second side of the optical element, and extends over the substrate. In addition, the substrate is disposed between the heat-dissipating device and the optical element.

In an embodiment, the optical module further comprises a heat-dissipating medium disposed between the cover plate and the optical element, between the cover plate and the substrate, and/or between the substrate and the heat-dissipating device. The cover plate has an opening exposing the second side of the optical element, and the cover plate has an upper portion and a lower portion that are connected to each other. The upper portion and the optical element partially overlap, the lower portion is connected to the substrate via the heat-dissipating medium, and the extending directions of the upper portion and the lower portion are located on different horizontal planes.

In an embodiment, the optical module further comprises a conductive medium disposed between the substrate and the optical element. In addition, the optical module further comprises a circuit board and a contact, wherein the circuit board is connected to the substrate via the contact. The optical module further comprises an interconnection layer formed in the substrate, wherein the conductive medium is electrically connected to the contact via the interconnection layer. The optical module further comprises a through-hole formed in the substrate, wherein the through-hole is electrically isolated from the interconnection layer. In an embodiment, the substrate further comprises a metal layer, the metal layer is connected to the through-hole and covers a surface of the substrate, and the surface faces the heat-dissipating device. The metal layer is electrically isolated from the interconnection layer.

In an embodiment, the optical module further comprises a lens disposed on the second side of the optical element.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The optical modules of some embodiments of the present disclosure are described in the following description. However, it should be appreciated that the following detailed description of some embodiments of the disclosure provides various concepts of the present disclosure which may be performed in specific backgrounds that can vary widely. The specific embodiments disclosed are provided merely to clearly describe the usage of the present disclosure by some specific methods without limiting the scope of the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

Figure 1:
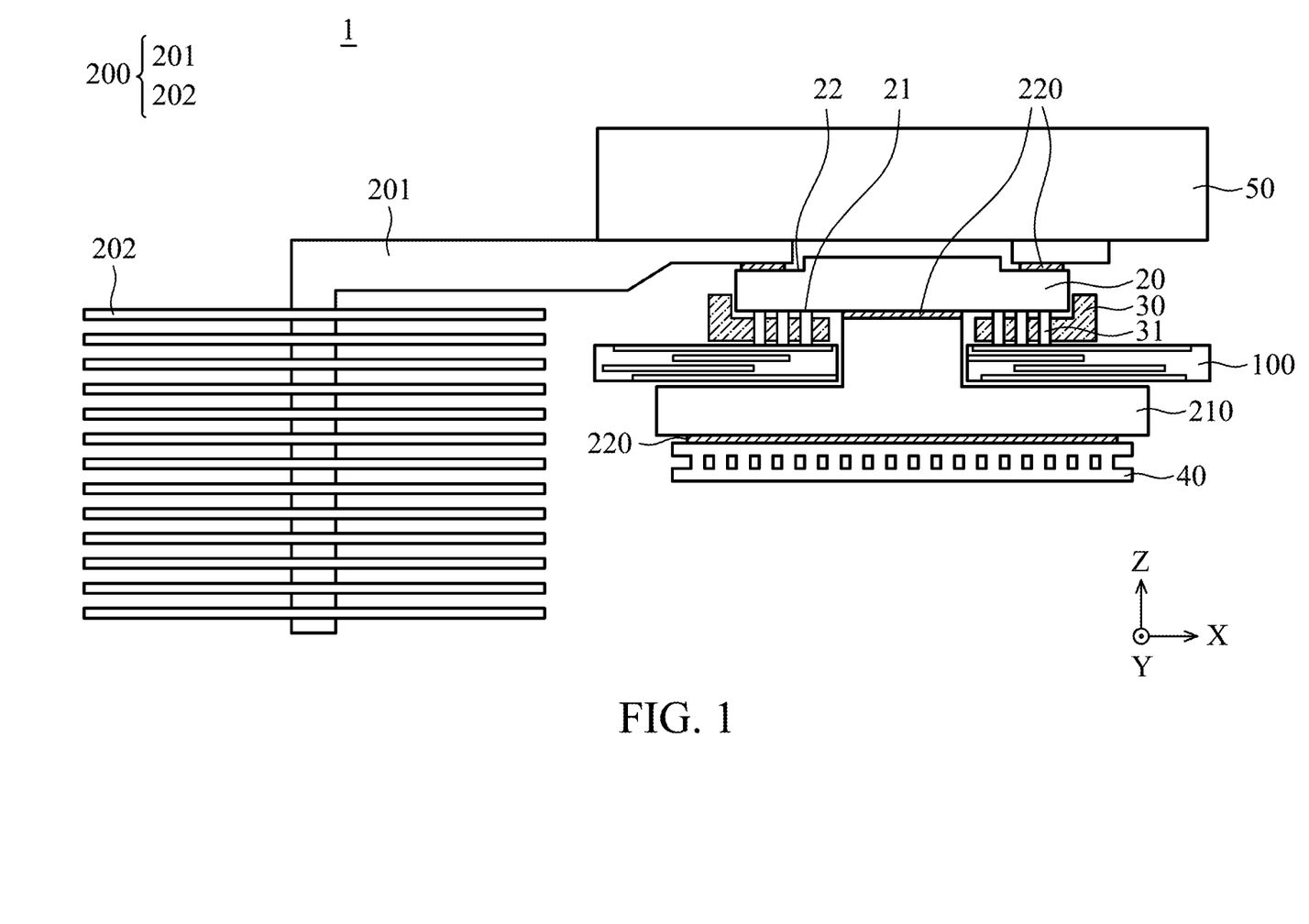
FIG. 1 is a cross-sectional view illustrating an optical module in accordance with a comparative example of the present disclosure.

Referring to FIG. 1, FIG. 1 is a cross-sectional view illustrating an optical module 1 in accordance with a comparative example of the present disclosure. The optical module 1 mainly includes a circuit board 100, an optical element 20, a holder 30, a heat-dissipating device 40, a lens 50, and a heat-dissipating assembly 200. The optical element 20 is disposed on the circuit board 100 via the holder 30, and is electrically connected to the circuit board 100 via the conductive structure 31 in the holder 30 for transmitting electrical signals to the optical element 20. The optical element 20 may be controlled by the electrical signals. The optical element 20 has a first side 21 and a second side 22, the first side 21 faces the circuit board 100, and the second side 22 is opposite the first side 21. For example, the optical element 20 is a digital micromirror device, and reflects light which is incident to the optical element 20. The optical element 20 may be used in a projector, but it is not limited thereto. In other embodiments, the optical element 20 may be any element receiving and/or reflecting light, or another suitable optical element. The lens 50 is disposed on the second side 22 of the optical element 20, and configured to make the light incident to the optical element 20, and the reflection of the light is performed by the optical element 20.

It should be discussed in advance that in each embodiment of the present disclosure, the "front side" of the optical element 20 is defined as the surface, where the light is received and reflected, of the optical element 20. The "rear side" of the optical element 20 is the surface which is opposite the "front side" (namely, the surface that light cannot pass through). In other words, the second side 22 of the optical element 20 is the front side of the optical element 20, and the first side 21 is the rear side of the optical element 20.

To prevent the optical element 20 from overheating, the heat-dissipating assembly 200 is disposed on the second side 22 of the optical element 20, a metal block 210 is disposed on the first side 21 of the optical element 20, and both the heat-dissipating assembly 200 and the metal block 210 are connected to the optical element 20 via the heat-dissipating medium 220. Therefore, the heat energy generated on the first side 21 and the second side 22 of the optical element 20 is removed. As shown in FIG. 1, the heat-dissipating assembly 200 includes a heat conduction tube 201 and multiple fins 202, wherein the heat conduction tube 201 is made of a material with a high thermal conductivity, such as copper. The fins 202 are disposed on the heat conduction tube 201, and whereby the heat-dissipating area of the heat-dissipating assembly 200 may be increased, making the heat energy dissipate from the second side 22 of the optical element 20 more rapidly. In addition, the metal block 210 is made of a material with a high thermal conductivity, such as copper, and a certain thickness is required for a protruding portion of the metal block 210 to pass through the circuit board 100 and the opening of the holder 30. Therefore, the protruding portion may contact the heat-dissipating medium 220, which is disposed on the first side 21 of the optical element 20, making the heat energy of the optical element 20 dissipate from the second side 22 via the heat-dissipating medium 220 and the metal block 210.

In the present embodiment, the heat-dissipating medium 220 is a thermal interface material (TIM), such as a heat conduction paste with a high thermal conductivity, or a solid heat conduction pad. In addition, the heat-dissipating device 40 is disposed on the metal block 210, and whereby the heat-dissipating efficiency of the optical module 1 may be further increased. For example, the heat-dissipating device 40 may be a cooling chip, a heat-dissipating fin, a fan, a water cooling system, or any other suitable heat-dissipating device.

Figure 2:
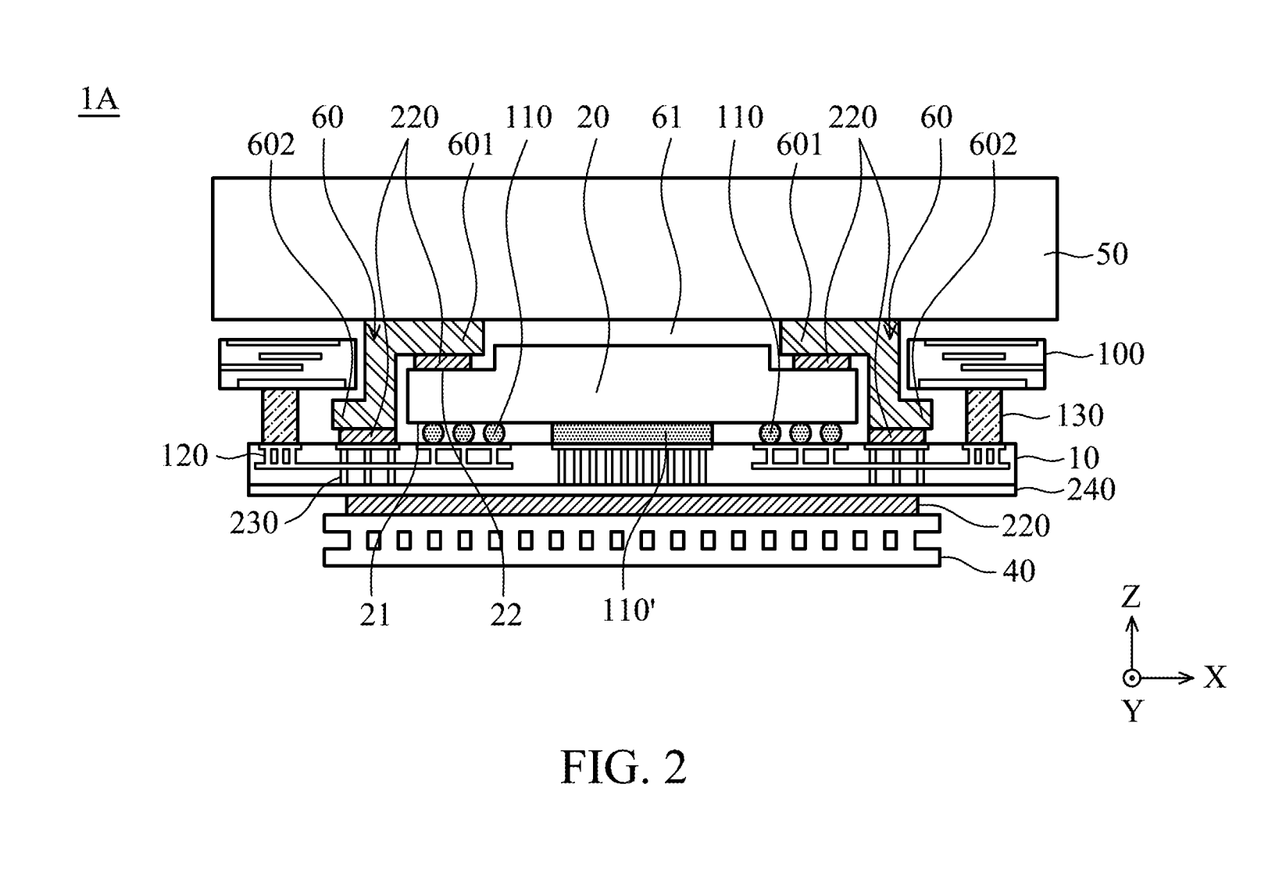
FIG. 2 is a cross-sectional view illustrating the optical module in accordance with an embodiment of the present disclosure.

Referring to FIG. 2, FIG. 2 is a cross-sectional view illustrating an optical module 1A in accordance with an embodiment of the present disclosure. It should be noted that the optical module 1A may include the same or similar elements as the optical module 1. Those elements that are the same or similar will be labeled with the same or similar numerals, and will not be discussed in detail again. As shown in FIG. 2, the optical module 1A mainly includes a substrate 10, an optical element 20, a heat-dissipating device 40, and a cover plate 60. In the present embodiment, the substrate 10 may be a printed circuit board that includes multi-layered conductive and insulating structures. The optical element 20 is disposed on the substrate 10, wherein the optical element 20 has a first side 21 and a second side 22, the first side 21 faces the circuit board 100, and the second side 22 (namely, the surface, receiving the light, of the optical element 20) is opposite the first side 21. The cover plate 60 is disposed on the second side 22 of the optical element 20. The cover plate 60 may extend over the substrate 10, and is connected to the substrate 10 and the optical element 20 via a heat-dissipating medium 220. Therefore, the cover plate 60 may transmit heat energy between the substrate 10 and the optical element 20.

In addition, the optical module 1A further includes a lens 50 disposed on the second side 22 of the optical element 20. The cover plate 60 has an opening 61, and the opening 61 exposes the second side 22 of the optical element 20 (namely, the front side of the optical element 20). Therefore, light may pass through the lens 50 and reach the optical element 20 via the opening 61. After being reflected by the optical element 20, the light is emitted to the external environment via the opening 61 and the lens 50. Furthermore, the cover plate 60 includes an upper portion 601 and a lower portion 602, which are connected to each other, wherein the upper portion 601 is connected to the optical element 20 via the heat-dissipating medium 220, and the lower portion 602 is connected to the substrate 10 via the heat-dissipating medium 220. As viewed in a vertical direction (Z-axis direction), the upper portion 601 and the optical element 20 may partially overlap. As viewed in the above direction, the lower portion 602 and the optical element 20 do not overlap. The extending direction (the X-axis direction in FIG. 2) of the upper portion 601 and the extending direction of the lower portion 602 are located on different horizontal planes (the X-Y planes). The arrangement of the upper portion 601 and the lower portion 602 at different heights allows the heat energy on the second side 22 of the optical element 20 to be transmitted to the substrate 10 that faces the first side 21 of the optical element 20.

The circuit board 100 is disposed outside of the cover plate 60. In other words, the cover plate 60 is disposed in a hole of the circuit board 100. A conductive medium 110 is disposed on the first side 21 of the optical element 20. In the present embodiment, the conductive medium 110 is disposed on the first side 21 of the optical element 20 in a manner similar to dispensing or screen printing, and the optical element 20 is connected to the substrate 10 via the conductive medium 110 (that is, the conductive medium 110 is disposed between the substrate 10 and the optical element 20). In other embodiments, the conductive medium 110 may be disposed in any suitable manner. For example, the conductive medium 110 may be a gel doped with silver, or any other suitable conductive material.

It should be particularly discussed that the conductive medium 110 includes a central portion 110' located on the center of the optical element 20. The central portion 110' is not a portion of the circuit (and not configured to transmit electrical signals), but instead serves as a medium to facilitate the heat-dissipation of the optical element 20. Accordingly, in some embodiments, the conductive medium 110 is a material with a high thermal conductivity to dissipate heat and transmit electrical signals at the same time. Therefore, the conductive medium 110 and the central portion 110' may be formed in a single process, and paths for transmitting electrical signals and heat-dissipation are also formed at the same time. A description of the paths for transmitting electrical signals and for heat-dissipation in the optical module 1A will be provided in the following paragraphs.

In some embodiments, the optical module 1A further includes contacts 130, wherein the substrate 10 is electrically connected to the circuit board 100 via the contacts 130, and electrical signals may be transmitted between the substrate 10 and the circuit board 100. The optical module 1A further includes an interconnection layer 120 formed in the substrate 10, and the conductive medium 110 is electrically connected to the contacts 130 via the interconnection layer 120. It should be understood that in the present embodiment, the interconnection layer 120 is schematically illustrated as a double-layered conductive structure, which includes a surface layer, an inner layer, and contacts connecting the former two layers. The surface layer is located on the surface of the substrate 10, and the inner layer is located inside the substrate 10. However, an interconnection layer including a multi-layered structure with any number of layers may be formed in the substrate 10 according to practical demand. Using the design described above, electrical signals from the circuit board 100 may be transmitted to the interconnection layer 120 in the substrate 10 via the contacts 130. Then, the electrical signals are transmitted to the optical element 20 via the conductive medium 110, whereby the operation of the optical element 20 is controlled.

Furthermore, a heat-dissipating medium 220 is disposed between the cover plate 60 and the optical element 20, and between the cover plate 60 and the substrate 10. In some embodiments, multiple through-holes 230 are formed in the substrate 10 using a technique such as etching, and a material like copper with a high thermal conductivity is filled in the through-holes 230. In addition, a metal layer 240 is disposed on the surface that faces the heat-dissipating device 40 of the substrate 10. The metal layer 240 is connected to the through-holes 230, and completely covers the substrate 10. The metal layer 240 is made of a material with a high thermal conductivity, such as copper. Since the metal layer 240 completely covers the substrate 10, the area for heat-dissipation may be significantly increased, such that the heat energy from the through-holes 230 may dissipate via the surface of the metal layer 240 more rapidly. The through-holes 230 and the metal layer 240 are both electrically isolated from the interconnection layer 120. Therefore, although the through-holes 230 and the metal layer 240 are connected to the first side 21 of the optical element 20 via the conductive medium 110, the through-holes 230 and the metal layer 240 are not a portion of the optical module 1A, and not configured to transmit electrical signals.

Generally, the cover plate 60 is made of a material with a high thermal conductivity, such as copper or another metallic material. In addition, the cover plate 60 connected to the substrate 10 extends to the second side 22 of the optical element 20, whereby the heat energy on the second side 22 of the optical element 20 may be directed to the through-holes 230, which are connected to the cover plate 60, in the substrate 10. Then, the heat dissipates via the metal layer 240 connected to the through-holes 230. Furthermore, the heat-dissipating device 40 is disposed on the metal layer 240 to further enhance heat-dissipating effect of the optical module 1A. The heat-dissipating medium 220 is disposed between the metal layer 240 and the heat-dissipating device 40. The thermal conductivity of a solid is much greater than the thermal conductivity of a gas. Therefore, if there is a gap between the metal layer 240 and the heat-dissipating device 40, gas in the gap may significantly reduce the heat-dissipating efficiency of the optical module 1A. Arranging the heat-dissipating medium 220, the metal layer 240, and the heat-dissipating device 40 in such a way that they are closely bonded without any gaps prevents the heat-dissipating efficiency of the optical module 1A from being affected.

It should be appreciated that the main difference between the optical module 1A and the optical module 1 is that as shown in FIG. 2, the optical element 20 of the optical module 1A is disposed on the substrate 10, but not disposed on the circuit board 100, which is configured to send electrical signals to control the optical module 1A. The optical element 20 is disposed on the substrate 10, which is separated from the circuit board 100. As the optical element 20 is damaged or needs to be substituted, only the substrate 10 needs to be removed to perform the substitution. Therefore, during the substitution of the optical element 20, other elements of the circuit board 100 are not affected. Moreover, the other elements of the circuit board 100 are prevented from being damaged when the optical element 20 is substituted.

Figure 3:
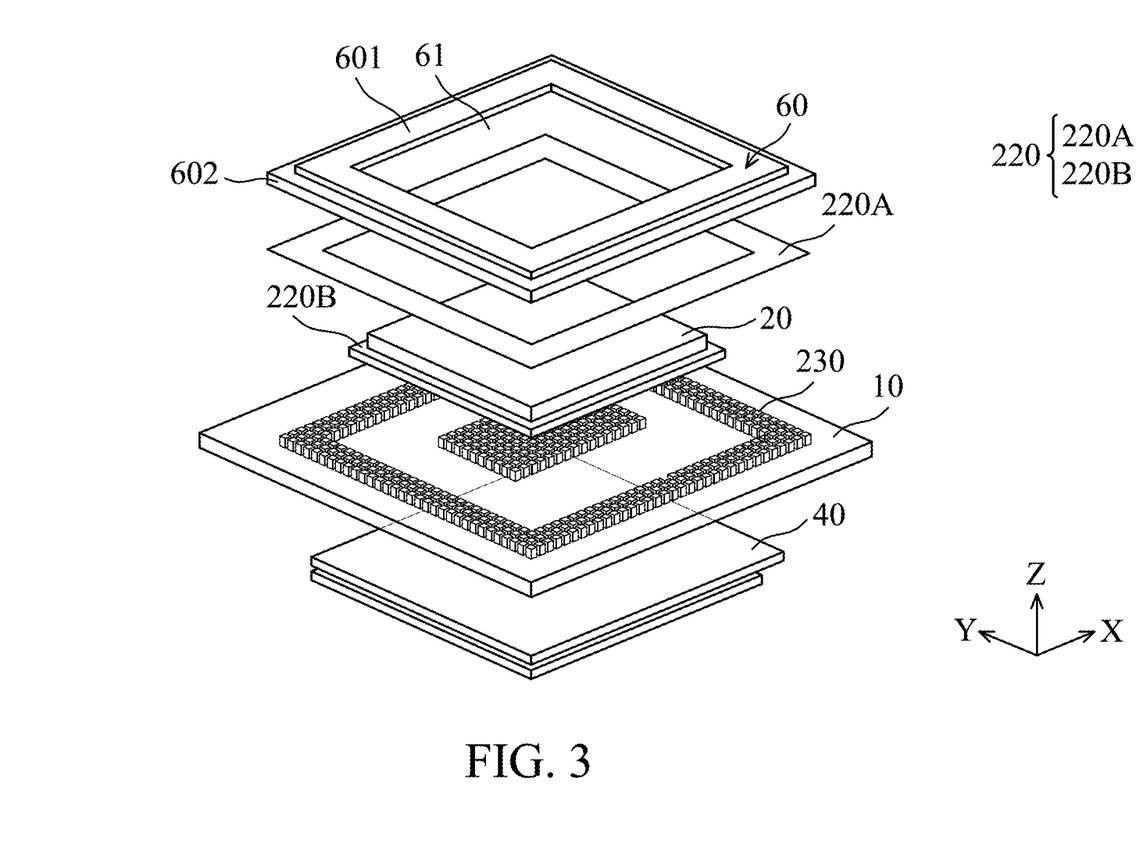
FIG. 3 is a perspective view illustrating a substrate, and optical element, a heat-dissipating device, and a cover plate separated from each other in accordance with an embodiment of the present disclosure.

Referring to FIG. 3, FIG. 3 is a perspective view illustrating the substrate 10, the optical element 20, the heat-dissipating device 40, and the cover plate 60, which are separated from each other, of the optical module 1A shown in FIG. 2. It should be noted that for clearly describing the distribution and positions of the through-holes 230, in the present embodiment, only the through-holes 230 are illustrated in the substrate 10. The remaining structure in the substrate 10 is not shown. The heat-dissipating medium 220 shown in FIG. 3 includes a heat-dissipating medium 220A disposed between the optical element 20 and the cover plate 60, and a heat-dissipating medium 220B in contact with the through-holes 230. As shown in FIG. 3, the through-holes 230 are distributed at the center and edges of the substrate 10, wherein the through-holes 230 distributed in the center of the substrate 10 are disposed directly below the optical element 20 (along the Z-axis direction), and the through-holes 230 distributed at the edges of the substrate 10 receive heat energy from the cover plate 60 via the heat-dissipating medium 220A. It should be appreciated that although in the present embodiment, the cover plate 60 and the opening 61 therein are both illustrated as rectangles, in other embodiments, the shapes of the cover plate 60 and the opening 61 may be adjusted according to design demands. These shapes may include circles, polygons, or any regular or irregular shape. The distribution of the through-holes 230 in the substrate 10 may be adjusted accordingly.

Figure 4:
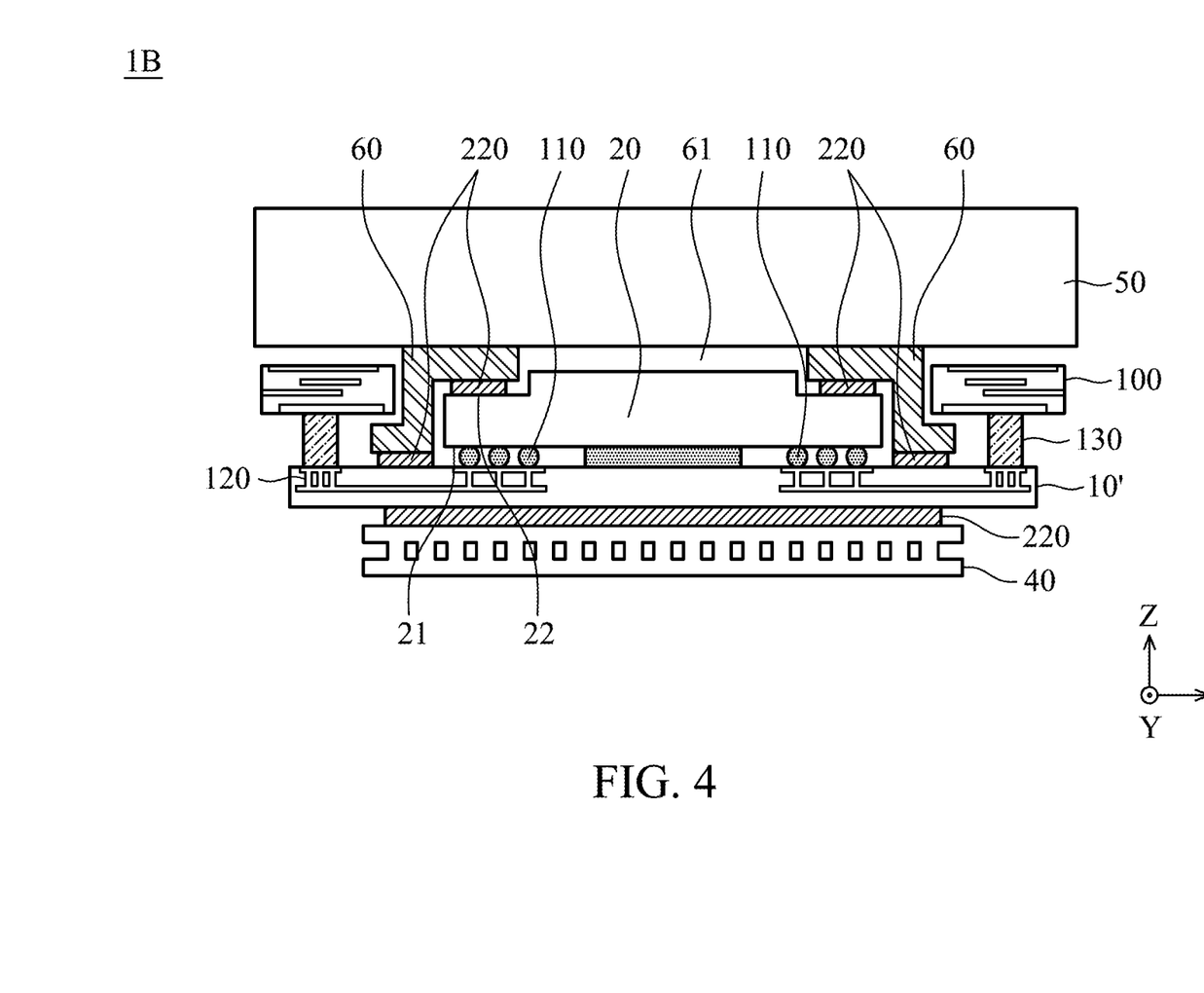
FIG. 4 is a cross-sectional view illustrating the optical module in accordance with another embodiment of the present disclosure.

Referring to FIG. 4, FIG. 4 is a cross-sectional view illustrating an optical module 1B in accordance with another embodiment of the present disclosure. It should be noted that the optical module 1B in the present embodiment may include the same or similar elements as the optical module 1A shown in FIG. 2. Those elements that are the same or similar are labeled with the same or similar numerals, and are not discussed in detail again. The main difference between the optical module 1B and the optical module 1A is that in the present embodiment, the substrate 10 of the optical module 1A is replaced by the substrate 10', which is made of a metal material such as aluminum. Since the substrate 10' itself has a relatively high thermal conductivity, the through-holes 230 and the metal layer 240 are not required to be disposed anymore, and the heat-dissipating effect is still good. In addition, an insulating layer (not shown) is disposed around the interconnection layer 120. Since the insulating layer completely wraps the interconnection layer 120, the interconnection layer 120 is prevented from contacting the substrate 10', causing a short circuit. In addition, in other embodiments, the substrate of the optical module may be a composite sheet such as graphite.

Figure 5:
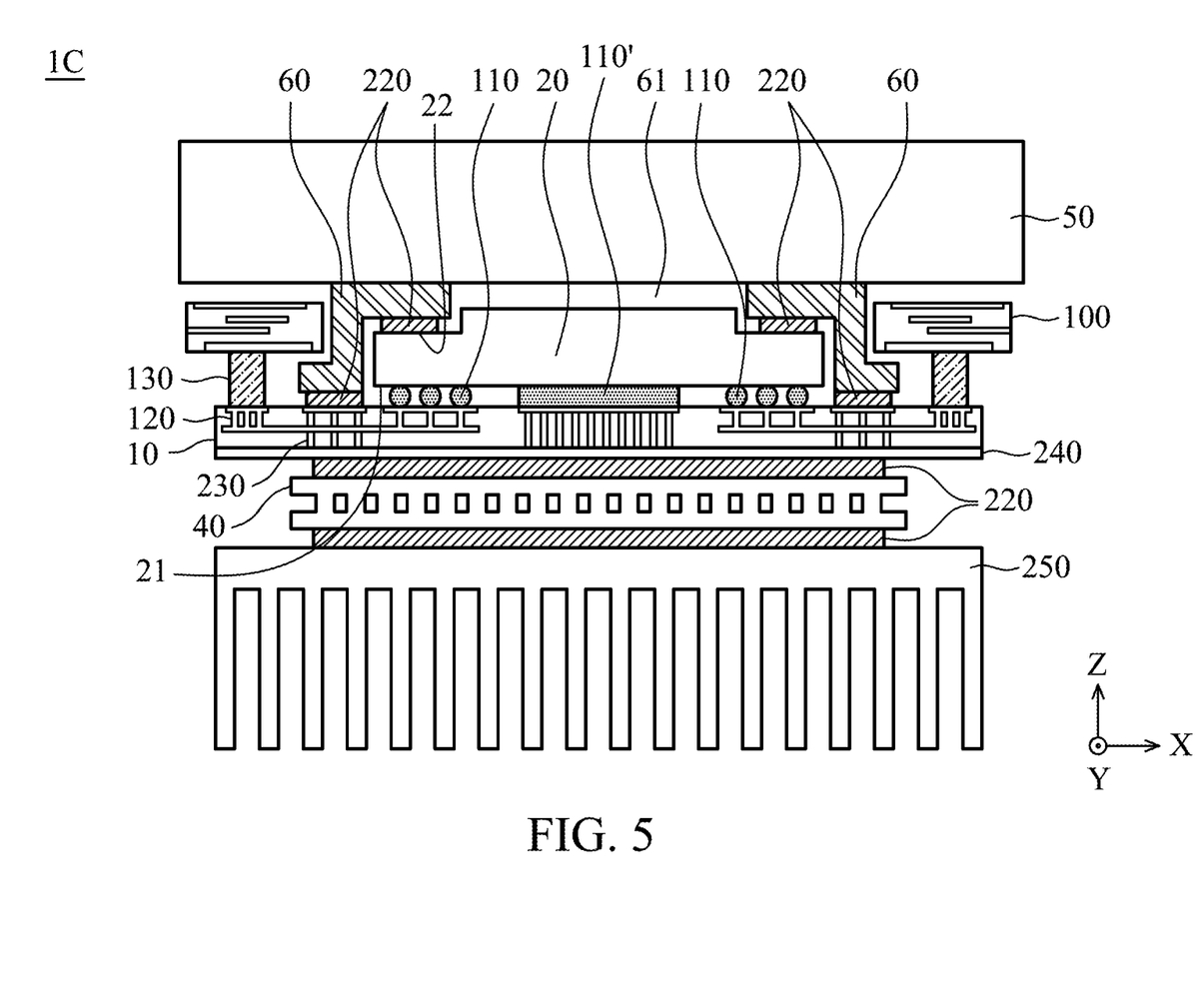
FIG. 5 is a cross-sectional view illustrating the optical module in accordance with another embodiment of the present disclosure.

Referring to FIG. 5, FIG. 5 is a cross-sectional view illustrating an optical module 1C in accordance with another embodiment of the present disclosure. It should be noted that the optical module 1C in the present embodiment may include the same or similar elements as the optical module 1A shown in FIG. 2. Those elements that are the same or similar will be labeled with the same or similar numerals, and will not be discussed in detail again. The main difference between the optical module 1C and the optical module 1A is that in the present embodiment, besides the heat-dissipating device 40, additional heat-dissipating fins 250 may be disposed, and the heat-dissipating fins 250 are connected to the heat-dissipating device 40 via the heat-dissipating medium 220. The heat-dissipating area of the optical module 1C may be increased further by arranging the heat-dissipating fins 250 in such a way that they enhance the heat-dissipating effect. It should be appreciated that in other embodiments, the heat-dissipating fins 250 may be replaced by other heat-dissipating devices according to the conditions of use of the optical element 20, and these other heat-dissipating devices may include a fan, a water cooling system, or any other suitable heat-dissipating device. In other embodiments, in addition to the heat-dissipating device 40 and the heat-dissipating fins 250, any other suitable heat-dissipating device may be additionally disposed, and they may be connected to each other via the heat-dissipating medium 220.

As set forth above, the present disclosure provides an optical module including a cover plate. The arrangement of the cover plate means that heat-dissipating devices only need to be disposed on one side of the optical element. The heat energy generated on the front side and the rear side of the optical element may be removed at the same time, reducing the space and cost that would be incurred by additional heat-dissipating devices, and an optical module with a reduced volume may be obtained.

Moreover, the optical element is individually disposed on a substrate in the present embodiment. Therefore, when the optical element needs to be substituted, only the substrate needs to be unloaded, and other elements on the circuit board are protected from damage during the substitution of the optical element. In addition, through-holes are disposed in the substrate for heat-dissipation. Compared to the use of a traditional metal block for heat-dissipation, the thickness of the optical module may be reduced significantly.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An optical module, comprising:
a substrate;
an optical element disposed on the substrate, wherein the optical element has a first side and a second side, the first side faces the substrate, and the second side is opposite the first side;
a cover plate, disposed on the second side of the optical element, extending over the substrate;
a heat-dissipating device, wherein the substrate is disposed between the heat-dissipating device and the optical element; and
a circuit board having a first side facing the substrate and a second side opposite to the first side, wherein the cover plate extends from the first side of the circuit board to the second side of the circuit board through an opening of the circuit board, and the optical element is disposed in the opening of the circuit board.

2. The optical module as claimed in claim 1, further comprising a heat-dissipating medium disposed between the cover plate and the optical element, between the cover plate and the substrate, and/or between the substrate and the heat-dissipating device.

3. The optical module as claimed in claim 2, wherein the cover plate has an opening exposing the second side of the optical element, and the cover plate has an upper portion and a lower portion connected to each other, wherein the upper portion and the optical element partially overlap, the lower portion is connected to the substrate via the heat-dissipating medium, and extending directions of the upper portion and the lower portion are located on different horizontal planes.

4. The optical module as claimed in claim 1, further comprising a conductive medium disposed between the substrate and the optical element.

5. The optical module as claimed in claim 4, further comprising a contact, wherein the circuit board is connected to the substrate via the contact.

6. The optical module as claimed in claim 5, further comprising an interconnection layer formed in the substrate, wherein the conductive medium is electrically connected to the contact via the interconnection layer.

7. The optical module as claimed in claim 6, further comprising a through-hole formed in the substrate, wherein the through-hole is electrically isolated from the interconnection layer.

8. The optical module as claimed in claim 7, wherein the substrate further comprises a metal layer, the metal layer is connected to the through-hole and covers a surface of the substrate, and the surface faces the heat-dissipating device.

9. The optical module as claimed in claim 8, wherein the metal layer is electrically isolated from the interconnection layer.

10. The optical module as claimed in claim 1, further comprising a lens disposed on the second side of the optical element.

11. An optical module, comprising:
a substrate;
an optical element disposed on the substrate, wherein the optical element has a first side and a second side, the first side faces the substrate, and the second side is opposite the first side;
a cover plate, disposed on the second side of the optical element, extending over the substrate;
a heat-dissipating device, wherein the substrate is disposed between the heat-dissipating device and the optical element; and a circuit board having a first side facing the substrate and a second side opposite to the first side, wherein the cover plate extends from the first side of the circuit board to the second side of the circuit board, and the cover plate is in contact with the optical element to transfer the heat energy outward and downward from the optical element to the heat-dissipating device.

\* \* \* \* \*